United States Patent
Wexler et al.

(10) Patent No.: US 8,595,369 B2
(45) Date of Patent: Nov. 26, 2013

(54) METHOD AND SYSTEM FOR CORRELATING FRONT-END AND BACK-END TRANSACTIONS IN A DATA CENTER

(75) Inventors: Asaf Wexler, Raanana (IL); Ronen Heled, Kiryat-Ono (IL)

(73) Assignee: VMware, Inc., Palo Alto, CA (US)

( * ) Notice: Subject to any disclaimer, the term of this patent is extended or adjusted under 35 U.S.C. 154(b) by 627 days.

(21) Appl. No.: 12/105,102

(22) Filed: Apr. 17, 2008

(65) Prior Publication Data

US 2009/0125532 A1   May 14, 2009

Related U.S. Application Data

(60) Provisional application No. 60/987,743, filed on Nov. 13, 2007.

(51) Int. Cl.
  *G06F 15/16* (2006.01)
  *G06F 15/167* (2006.01)
(52) U.S. Cl.
  USPC ............ 709/229; 709/203; 709/213

(58) Field of Classification Search
  USPC .......................... 709/223, 224, 229
  See application file for complete search history.

(56) References Cited

U.S. PATENT DOCUMENTS

| | | |
|---|---|---|
| 6,816,903 B1 | 11/2004 | Rakoshitz et al. |
| 2002/0062369 A1 | 5/2002 | Von Klopp et al. |
| 2002/0099818 A1 | 7/2002 | Russell et al. |
| 2004/0088386 A1 | 5/2004 | Aggarwal |
| 2005/0027858 A1 | 2/2005 | Sloth et al. |
| 2005/0049924 A1 | 3/2005 | Debettencourt et al. |
| 2005/0159927 A1 | 7/2005 | Cruz et al. |
| 2007/0266149 A1* | 11/2007 | Cobb et al. .............. 709/224 |

* cited by examiner

*Primary Examiner* — Afshawn Towfighi (57) ABSTRACT

A system and method for correlating front-end and back-end transactions in a data center. The method includes gathering front-end and back-end transactions; analyzing pairs of transactions to detect correlated front-end and back-end transactions; saving correlated pairs in a database; and displaying the correlated pairs on a graphical user interface (GUI). In accordance with an embodiment of the invention the detection of correlated pairs may be performed using content matching analysis, time proximity analysis, and attributes analysis.

29 Claims, 4 Drawing Sheets

METHOD AND SYSTEM FOR CORRELATING FRONT-END AND BACK-END TRANSACTIONS IN A DATA CENTER

CROSS REFERENCE TO RELATED APPLICATIONS

This application claims benefit from a U.S. provisional application 60/987,743 filed on Nov. 13, 2007 which is hereby incorporated for all that it contains.

TECHNICAL FIELD

The invention relates generally to controlling and managing the performance of web applications in data centers.

BACKGROUND OF THE INVENTION

Enterprises and organizations expose their business information and functionality on the web through software applications, usually referred to as "web applications". Web applications provide great opportunities for an organization. The web applications use the Internet technologies and infrastructures. These applications are generally event-driven software programs which react to hypertext transfer protocol (HTTP) requests from the client. The applications are generally executed on application servers coupled to back-end systems.

Figure 1:
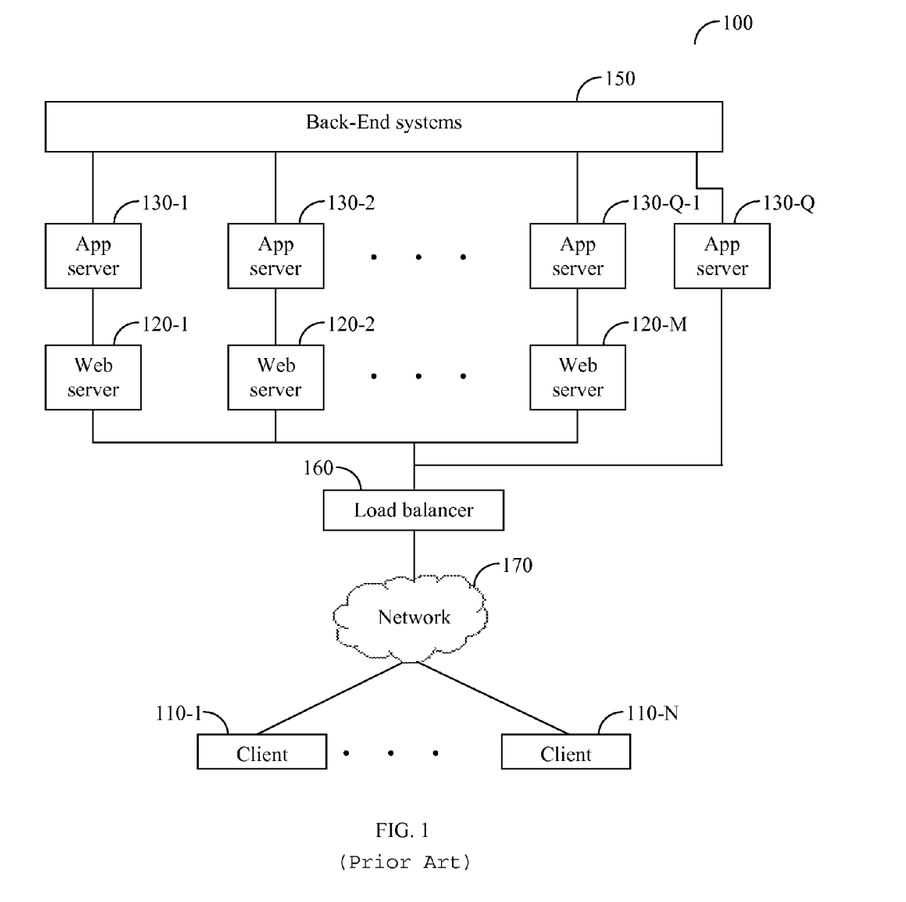
FIG. 1 is a non-limiting diagram of a data center utilized for executing web applications.

FIG. 1 shows an exemplary data center 100 that is utilized for executing web applications. Clients 110 submit requests (e.g., HTTP requests) to web servers 120 through a network 170. A load balancer 160 distributes the requests between the servers 120 to balance the load. A web server 120 dynamically generates a presentation, for example, using servlets, or extensible markup language (XML), extensible style-sheet language (XSL), and the likes. Application servers 130 are often responsible for deploying and running the business logic layer and for interacting with and integrating various enterprise-wide resources, such as web servers 120 and back-end systems 150. The back-end systems 150 may include, for example, a database server and a legacy system. Typically, the back-systems 150 operate and respond to requests sent from the clients 110 and forwarded by the application servers 130.

As an example, the web application executed by the data center 100 is a finance application (such as used to access a bank account) through which a user of a client 110 requests to view the account's balance. Typically, the client 110 generates a HTTP request that triggers a SQL query with input values of at least the account number of the user. In that case, the HTTP request will typically include the account number and the requested action. The SQL query, generated based on that input in the URL's field, may be:

```
select balance from Accounts where
    Account_Number=<input account number>
```

An application server 130 processes the incoming HTTP request and forwards the SQL query to one of the back-end systems 150 (e.g., a database server) that maintains the account's balance of the user. That is, the back-end system executes the SQL query generated in response to the HTTP request, and thereafter replies with the balance value which is presented to the user using a web server 120. Transactions executed by the application server 130 will be referred hereinafter as "front-end transactions", while transactions proceed by the back-end systems 150 will be referred hereinafter as "back-end transactions."

In the related art there are many tools to monitor and control the operation and performance of data centers in order to prevent situations of, for example, unpredictable levels of service and uncontrolled user experience. Typically, such tools pertain to determine if front-end transactions are processed properly and to monitor the operation of the back-end systems 150 as stand-alone systems. As a result, the existing tools cannot correlate between front-end and back-end transactions, and therefore a root cause of low performance transactions in the data center cannot be detected. For example, a request to check an account balance cannot be performed due to a malfunction or a delayed response of an application server, a web server, a back-end system, or the network connected a client to a web server or an application server to a back-end system.

Therefore, it would be advantageous to provide a solution for correlating between front-end and back-end transactions executed in a data center.

BRIEF DESCRIPTION OF THE DRAWINGS

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

DETAILED DESCRIPTION OF THE INVENTION

Figure 2:
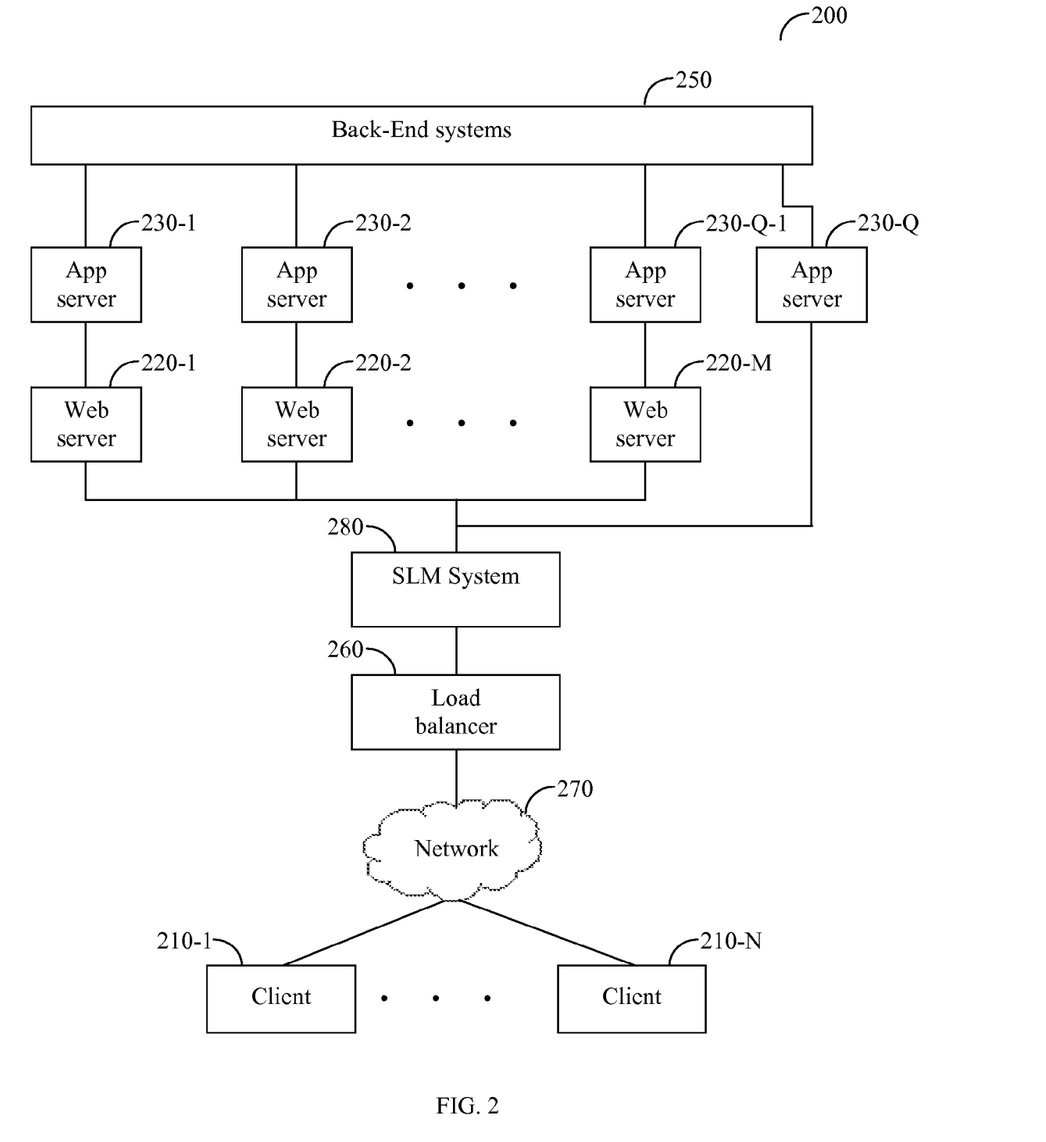
FIG. 2 is a diagram of a network system used to describe various embodiments realized in accordance with the invention.

FIG. 2 shows a non-limiting and exemplary diagram of a data center 200 describing certain principles of the invention. The system 200 includes clients 210-1 through 210-N, web servers 220-1 through 220-M, application servers 230-1 through 230-Q connected to backend systems 250, a load balancer 260, and a network 270. The system 200 further includes a network device 280 connected between the application servers 230 and the back-end system 250. The connection maybe through a SPAN port of a switch (not shown) or a TAP device (not shown) that sniffs traffic sent from the application servers 230.

The web servers 220 process requests sent from the clients 210 and respond with the processing results. The application servers 230 execute the business logic of the web applications and communicate with the back-end systems 250, which implement the data layer of the applications. The load balancer 260 mainly distributes incoming requests to servers 220 and 230 that run the web applications to which the requests are targeted.

The back-end systems 250 may include database servers, legacy systems, and the likes. A database server may be, but is not limited to, Oracle® Database Server, Microsoft™ SQL server, DB2, Sybase, MySQL server, and so on. A database server may include any type of non-volatile storage and is directly coupled to this server. In some configurations, a web server and a web application may act as, or in fact be, a single entity, e.g., a server 230-Q.

The network device 280 analyzes traffic directed to the back-end systems 250. As depicted in FIG. 2, the network device 280 is configured to operate in the line of traffic, i.e., traffic passing directly through system 280 to the back-ends systems 250. The network device 280 may also operate as a passive sniffing device coupled between application servers 230 and the back-ends systems 250.

In accordance with an embodiment of the invention the network device 280 collects and correlates between front-end and back-end transactions. An example for a back-end transaction is a SQL transaction executed by at least a database server of a back-end system 250. A SQL transaction typically includes a SQL query represented by the use of a proprietary protocol of a database server. The network device 280 detects and collects of SQL queries in traffic flows from the application servers 230 to the backend systems 250 and HTTP requests that generate the respective SQL queries. Then, the network device 280 tries to find correlated pairs of HTTP requests and SQL queries. The network device 280 can further monitor and measure various performance parameters of the correlated pairs.

Figure 3:
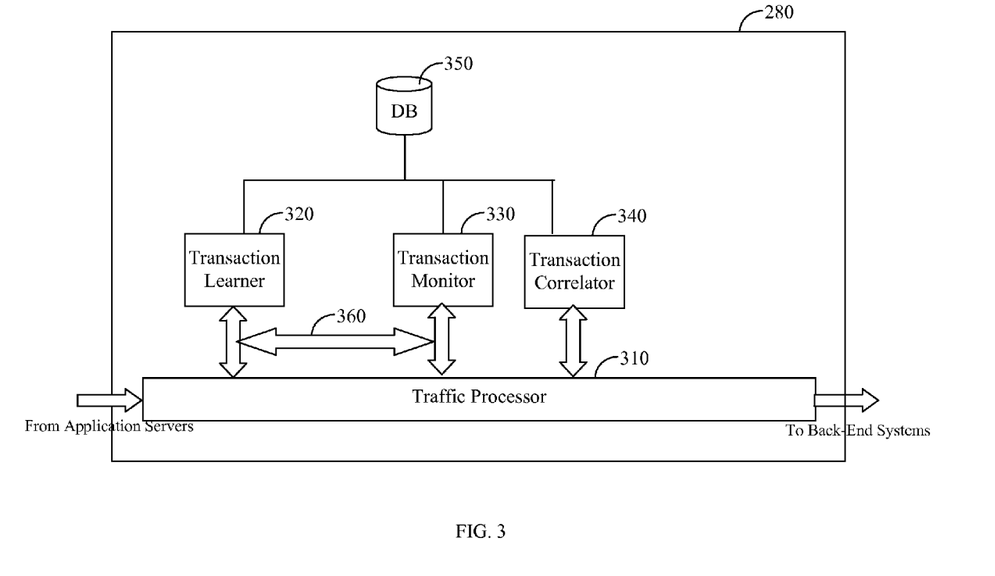
FIG. 3 is a block diagram of a network device implemented in accordance with certain embodiments of the invention.

FIG. 3 shows an exemplary and non-limiting block diagram of the network device 280 implemented in accordance with an embodiment of the invention. The network device 280 comprises a traffic processor 310, a transaction learner 320, a transaction monitor 330, and a transaction correlator 340 connected to a common bus 360. The network device 280 further includes a database 350 coupled to the transaction learner 320, monitor 330, and correlator 340. The transaction learner 320 includes classifier and collector modules (not shown). In some configurations the transaction learner 320 and correlator 340 may be implemented in a single module. An example for the functionality of the traffic processor 310, the transaction learner 320, and the transaction monitor 330 are described in greater detail in a U.S. patent application Ser. No. 11/682,426 assigned to the common assignee and it is hereby incorporated for all that it contains.

The traffic processor 310 captures traffic that flows from a client 210 to the backend system 250 through the application server 230. The traffic may include HTTP requests sent by clients 210, SQL queries generated by the application servers 230, SQL replies sent from the back-end systems 250 to the application server 230, and HTTP replies sent by the web-servers 220 to the clients 220. The traffic processor 310 processes the traffic to output, which are saved in database 350. A skeleton, which is a predefined logical division of a query or a request allows for efficient clustering of at least HTTP requests and SQL queries. For example in the following SQL query:

SELECT a, c FROM t WHERE w=z the 'a' and 'c' values represent columns to be retrieved from a table 't' and which satisfy the condition 'w=z'.
An example for a skeleton for this type query may be:

SELECT a, c FROM t WHERE w

When the number of skeletons recorded in the database 350 is above a predefined threshold the correlation task is triggered. Then, the transaction correlator 340 processes the recorded pairs of front-end (e.g., HTTP) and back-end (e.g., SQL) skeleton to identify correlated pairs of transactions by utilizing various correlation analysis techniques. These techniques include at least a timing proximity analysis, a content matching analysis, and an attributes based analysis.

The timing proximity analysis includes determining the time proximity that a back-end transaction is received after a respective front-end transaction. For example, if a front-end transaction (i.e., request) FE1 triggers a back-end request BE1, then BE1 should appear immediately after FE1. As a typical application server handles many front-end transactions simultaneously and there are many back-end transactions that are received during a time window of front-end transaction, the identification of correlated pairs is achieved by using a statistical binding.

With this aim, for each front-end transaction instance, all back-end transactions that were detected during a time window of that front-end transaction are analyzed. A time window of a front-end transaction is the time between the (last byte of the) request and the (first byte of the) reply, as captured by the network device 280. For each pair of front-end and back-end transaction skeletons it is determined if its number of appearances reflects a statistical binding.

In accordance with an embodiment of the invention a statistical binding determination is performed using a time proximity score calculated for each pair being evaluated. This score is the distance in standard-deviation units between the expected number of appearances of the pair under the assumption that the pair is not correlative, and the actual number of back-end transaction instances that were detected within the time window of the respective front-end transaction. The score is calculated in relation to a predefined time interval, which is the time in which the correlator 340 processes transaction pairs saved in the database 350. The predefined time interval is the time in which the correlator 340 tries to detect correlated pairs. It is typically longer than a time window of a front-end transaction.

In one embodiment of the invention the time proximity score may be calculated as follows:

$$\text{SCORE} = \frac{\text{Total\_Count} - \text{RAND\_Count\_Exp}}{\text{RAND\_Count\_STD}}; \quad (1)$$

The value Total_Count is the total number of times that an instance of a back-end transaction BE_Y counted within the time window of a front-end transaction FE_X. The value RAND_Count_Exp is the expected number of BE_Y instances within the time window of FE_X, assuming that the two transactions are not correlated. The RAND_Count_Exp may be calculated as follows:

$$\text{RAND\_Count\_Exp} = \text{Total\_BE\_Y\_count} * \text{Prob\_FE\_X}; \quad (2)$$

Total_BE_Y_count is the total number of times that BE_Y was counted during the time interval. Prob_FE_X is the probability of an instance of FE_X to appear during the time interval. Prob_FE_X may be calculated as follows:

$$\text{Prob\_FE\_X} = \frac{\text{FE\_X\_Time\_Window}}{\text{Time\_Interval}}; \quad (3)$$

FE_X_Time_Window is the total amount of time that instances of FE_X appeared within the entire measurement time interval. RAND_Count_STD is the standard deviation of the count of BE_Y instances within the time window of FE_X, under the assumption that the two transactions are not correlated. The value of the RAND_Count_STD may be calculated as follows:

$$\text{RAND\_Count\_STD} = \sqrt{\frac{(\text{Total\_BE\_Y\_count} * \text{Probe\_FE\_X}) *}{(1 - \text{Probe\_FE\_X})}}; \quad (4)$$

A pair is saved as a correlated pair in the database 350 if its calculated score is above a predefined threshold. In some cases the pair has to satisfy a uniform distribution test of back-end transactions to be considered as a correlated pair. The uniform distribution test checks the number of back-end transactions for each front-end instance. A valid pair is when the distribution of the count of back-end transactions over each front-end instance is uniform. For example, Table 1 shows a distribution which is not uniform:

TABLE 1

| Number of front-end request X | Number of back-end requests Y within the time window of front-end request X |
|---|---|
| 1 | 0 |
| 1 | 0 |
| 1 | 0 |
| 1 | 0 |
| 1 | 0 |
| 1 | 20 |
| 1 | 0 |
| 1 | 0 |
| 1 | 0 |
| 1 | 0 |
| 1 | 0 |

Table 2 provides an example for a valid pair with a uniform distribution of back-end transactions:

TABLE 2

| Number of front-end request X | Number of back-end requests Y within the time window of front-end request X |
|---|---|
| 1 | 1 |
| 1 | 1 |
| 1 | 1 |
| 1 | 1 |
| 1 | 1 |
| 1 | 1 |
| 1 | 1 |
| 1 | 1 |
| 1 | 1 |
| 1 | 1 |
| 1 | 1 |

In accordance with another embodiment of the invention a correlation between asynchronous transactions is performed. This case is applied when a front-end transaction is completed prior to a back-end transaction, even if it was triggered by the front-end transaction. For example, internal updates triggered by a front-end action and executed by a back-end system. In such cases, the front-end transaction does not wait to the internal updates (i.e., back-end action) to be completed.

A correlation of synchronous transactions is achieved using time-difference analysis. This analysis includes detecting a time interval or intervals in which a front-end transaction is active and a number of instances of a back-end transaction that is abnormal. This can be achieved using any statistical computing technique. All back-end transactions detected during the "abnormal" time interval or intervals are further analyzed to determine if they are correlated to an instance of a front-end transaction. This can be performed using any correlation analysis technique discussed by the invention and their equivalencies. For example, Table 3 shows a number of instances of a back-end transaction during time intervals of 10 ms.

TABLE 3

| | Time [ms] | | | | | | | | |
|---|---|---|---|---|---|---|---|---|---|
| | 10 | 20 | 30 | 40 | 50 | 60 | 70 | 80 | 90 |
| Number of BEs | 7 | 5 | 6 | 25 | 8 | 5 | 7 | 6 | 6 |

As can be noticed an abnormal number of back-end transactions is counted between 30 ms and 50 ms.

In accordance with another embodiment of the invention a content matching analysis technique is utilized to detect correlated transactions. This technique tries to match values (such as, names, numbers, etc.) that are included both in the front-end and back-end transactions. For example, a HTTP request to get an account balance typically includes the actual account number, and therefore all SQL queries that include the same account number and are received during a predefined time frame will be associated with the HTTP request. Of course, the content matching analysis can be applied to HTTP replies.

The content matching analysis technique calculates a content-matching score for each pair being evaluated. This score is calculated as the number of instances of pairs of transactions having matched values. For example, the value field in the HTTP and SQL requests shown above is 'id'. Therefore, each time that the 'id' value is the same in both requests the score of the respective pair is increased. If the content-matching score is above a predefined threshold the pair is saved as a correlated pair in the database 350.

The content matching and time proximity techniques can be used together to determine if a pair of transactions are correlated. Furthermore, other correlation analysis techniques may be utilized for this purpose. These techniques are based on analyzing various attributes of the transactions.

According to one embodiment of the invention pairs of front-end and back-end transactions having a relatively large size, or transactions with high latency (i.e., time from last byte of request to first byte of reply) and are received within a predefined time frame (e.g., 1 second), are saved as correlated pairs in the database 350. For example, a size of a typical reply is 10K bytes, and replies having sizes of above 100K bytes are candidate correlated pairs. In addition, pairs of transactions with a fixed size ratio may also be considered as correlated pairs. A size ratio is the ratio between the size (e.g., in bytes) of a front-end transaction and a size of a back-end transaction.

Corrected pairs can be used by the monitor 330 to monitor the performance of correlated front-end and back-end transactions. For example, the monitor 330 can monitor the latency in various places along the path, i.e., front-end latency, network latency, and back-end latency. The front-end latency is the time that it takes to wait for an application server 230 to process a front-end transaction. The network latency is the time that it takes for packets to go through the network. The back-end latency is the time that is required for a back-end system to execute a back-end transaction and respond to application server 230. This is opposed to approaches that measure only the time between sending a request and receiving a full response from a server. Therefore, the monitoring tasks, executed by the network device 280, produce information that allows a system administrator to easily detect the root-cause of at least latency related problems.

Correlated transactions can be also presented to a user (e.g., a system administrator) on a graphical user interface (GUI). This enables to easily perform root-cause analysis once a front-end transaction is known to experience performance problems. The correlated transactions presentation further allows for "profiling" analysis. For example, if the performance of a specific front-end transaction needs to be improved, the GUI directs the user to back-end transactions that are correlated to this front-end transaction, and which of the back-end transactions is best to improve in order to improve the FE performance. In addition, the GUI provides the user a view of a back-end transaction and its correlated front-end transactions. Such view enables the users to determine the impact of a low performance back-end transaction on the entire functionality of the application.

Figure 4:
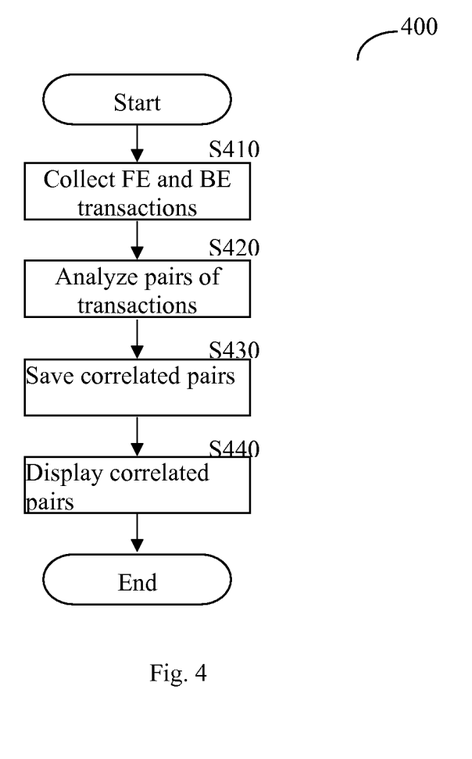
FIG. 4 is a flowchart describing the method for correlating front-end and back-end transactions implemented in accordance with certain embodiments of the invention.

FIG. 4 shows a non-limiting and exemplary flowchart 400 describing the method for correlating front-end and back-end transactions in data centers implemented according to the invention. At S410, transactions of front-end and back-end transactions are collected and saved in a database 520. At S420, pairs of transactions of front-end and back-end transactions are analyzed to detect correlated pairs. This can be preformed using one or more of the correlation analysis techniques including, but not limited to, a timing proximity analysis, a content matching analysis, and an attributed based analysis as described in greater detail above. At S430, correlated pairs are saved in a database for the purpose of monitoring and profiling of transactions. For example, statistics respective of the correlated transactions are gathered. The statistics may be measured on performance parameters, such as throughput, response time, hits per second, latency and number of returned errors. At S440, correlated pairs are displayed to users.

It should be noted that various modifications, combinations, sub-combinations and alterations of the above-described embodiments may occur, as required, insofar as they are within the scope of the appended claims or the equivalents thereof.

The principles of the invention may be implemented as a combination of hardware and software. The software may be implemented as an application program tangibly embodied on a program storage unit or computer readable medium. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the invention is programmed. Given the teachings herein, one of ordinary skill in the pertinent art will be able to contemplate these and similar implementations or configurations of the invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function, or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

The invention claimed is:

1. A method for correlating a front-end query transmitted in a computer network environment with a plurality of network-based back-end transactions relating to generation of a response to the front-end query, the method comprising:
identifying network-based back-end transactions occurring between transmission of the front-end query and receipt of the response to the front-end query;
analyzing each identified network-based back-end transaction to determine whether the network-based back-end transaction has a correlation with the front-end query, wherein the analyzing includes detecting and collecting at least one of a back-end query and a back-end reply of each identified network-based back-end transaction and wherein the analyzing comprises at least one of computing a timing proximity score that is a distance in standard-deviation units and determining a correlation between the front-end query and the identified network-based back-end transaction based on a byte size ratio; and
associating, in a database, the front-end query with each identified network-based back-end transaction determined to have a correlation with the front-end query.

2. The method of claim 1, further comprising displaying the associations on a user interface.

3. The method of claim 1, wherein the analyzing step comprises performing content matching analysis.

4. The method of claim 3, wherein performing content matching analysis further comprising:
computing a content-matching score by matching name-value pairs in the front-end query with name-value pairs in the identified network-based back-end transaction; and
comparing the content-matching score to a predefined value.

5. The method of claim 4, wherein a correlation is determined between the front-end query and the identified network-based back-end transaction when the content-matching score is above the predefined value.

6. The method of claim 1, wherein the analyzing step comprises performing time proximity analysis.

7. The method of claim 6, wherein performing the timing proximity analysis further comprises the step of computing the timing proximity score that reflects a statistical binding between the front-end query and the identified network-based back-end transaction.

8. The method of claim 7, wherein the timing proximity score is the distance in standard-deviation units between an expected number of appearances of the identified network-based back-end transaction upon transmission of the front-end query and an actual number of appearances of the identified network-based back-end transaction upon transmission of the front-end query.

9. The method of claim 7, wherein the timing proximity score determines a correlation between the front-end query and the identified network-based back-end transaction if a number of occurrences of the identified network-based back-end transaction during each transmission of the front-end query is uniform.

10. The method of claim 7, wherein the timing proximity determines a correlation between the front-end query and the identified network-based back-end transaction when the timing proximity score is above a predefined value.

11. The method of claim 1, wherein the analyzing step comprises performing attributes analysis.

12. The method of claim 11, wherein performing the attributes analysis further comprises determining a correlation between the front-end query and the identified network-based back-end transaction if the identified network-based back-end transaction occurs within a predefined time frame from transmission of the front-end query.

13. The method of claim 11, wherein performing the attributes analysis further comprises determining a correlation between the front-end query and the identified network-based back-end transaction if the byte size ratio between a byte size of the front-end query and a byte size of the identified network-based back-end-transaction matches a fixed size ratio.

14. A non-transitory computer-readable medium having stored thereon computer executable code when executed by a computer for correlating a front-end query transmitted in a computer network environment with a plurality of network-based back-end transactions relating to generation of a response to the front-end query, the non-transitory computer readable medium comprising executable code for:
identifying network-based back-end transactions occurring between transmission of the front-end query and receipt of the response to the front-end query;
analyzing each identified network-based back-end transaction to determine whether the network-based back-end transaction has a correlation with the front-end query, wherein the analyzing includes detecting and collecting at least one of a back-end query and a back-end reply of each identified network-based back-end transaction and wherein the analyzing comprises at least one of computing a timing proximity score that is a distance in standard-deviation units and determining a correlation between the front-end query and the identified network-based back-end transaction based on a byte size ratio; and
associating, in a database, the front-end query with each identified network-based back-end transaction determined to have a correlation with the front-end query.

15. The computer executable code of claim 14, further comprising displaying the associations on a user interface.

16. The computer executable code of claim 14, wherein the analyzing step comprises performing content matching analysis.

17. The computer executable code of claim 16, wherein performing content matching analysis further comprise:
computing a content-matching score by matching name-value pairs in the front-end query with name-value pairs in the identified network-based back-end transaction; and
comparing the content-matching score to a predefined value.

18. The computer executable code of claim 17, wherein a correlation is determined between the front-end query and the identified network-based back-end transaction when the content-matching score is above the predefined value.

19. The computer executable code of claim 14, wherein the analyzing step comprises performing time proximity analysis.

20. The computer executable code of claim 19, wherein performing the timing proximity analysis further comprises the step of computing the timing proximity score that reflects a statistical binding between the front-end query and the identified network-based back-end transaction.

21. The computer executable code of claim 20, wherein the timing proximity score is the distance in standard-deviation units between an expected number of appearances of the identified network-based back-end transaction upon transmission of the front-end query and an actual number of appearances of the identified network-based back-end transaction upon transmission of the front-end query.

22. The computer executable code of claim 20, wherein the timing proximity score determines a correlation between the front-end query and the identified network-based back-end transaction if a number of occurrences of the identified network-based back-end transaction during each transmission of the front-end query is uniform.

23. The computer executable code of claim 20, wherein the timing proximity score determines a correlation between the front-end query and the identified network-based back-end transactions when the timing proximity score is above a predefined value.

24. The computer executable code of claim 14, wherein the analyzing step comprises performing attributes analysis.

25. The computer executable code of claim 24, wherein performing the attributes analysis further comprises determining a correlation between the front-end query and the identified network-based back-end transaction if the identified network-based back-end transaction occurs within a predefined time frame from transmission of the front-end query.

26. The computer executable code of claim 24, wherein performing the attributes analysis further comprises determining a correlation between the front-end query and the identified network-based back-end transaction if the byte size ratio between a byte size of the front-end query and a byte size of the identified network-based back-end transaction matches a fixed size ratio.

27. A network device connected in a data center and capable of correlating a front-end query transmitted in a computer network environment with a plurality of network-based back-end transactions relating to generation of a response to the front-end query, comprising:
a traffic processor for intercepting the front-end query transmitted by a client terminal to an application server and for intercepting network-based back-end transactions transmitted by the application server to back-end systems, wherein the traffic processor is configured to identify network-based back-end transactions occurring between transmission of the front-end query and receipt of the response to the front-end query; and a transaction correlator for analyzing each identified network-based back-end transaction to determine whether the network-based back-end transaction has a correlation with the front-end query and associating the front-end query with each identified network-based back-end transaction determined to have a correlation with the front-end query, wherein the analyzing comprises at least one of computing a timing proximity score that is a distance in standard-deviation units and determining a correlation between the front-end query and the identified network-based back-end transaction based on a byte size ratio, wherein at least one of a back-end query and a back-end reply of each identified network-based back-end transaction is detected and collected.

28. The network device of claim 27, further comprising:
a database for storing the associations; and
a transaction monitor for measuring performance parameters on the associations stored in the database.

29. The network device of claim 27, wherein the transaction correlator performs at least one of the following techniques to analyze the front-end query and the plurality of network-based back-end transactions: a timing proximity analysis; a content matching analysis; and attributes based analysis.

* * * * *